Dec. 23, 1958  K. WAGNER  2,865,250
EYEPIECE FOR BINOCULAR INSTRUMENTS
Filed Oct. 29, 1954

Inventor:
Kurt Wagner

2,865,250
EYEPIECE FOR BINOCULAR INSTRUMENTS

Kurt Wagner, Jena, Germany, assignor to VEB Carl Zeiss Jena, Jena, Germany

Application October 29, 1954, Serial No. 465,518

1 Claim. (Cl. 88—34)

This invention relates to eyepieces for binocular instruments, particularly field glasses, of the kind in which for the purpose of adjusting the eyepieces to the distance between the eyes of the observer the eyepiece carriers are disposed to be rockable in relation to one another about a common axis, and in which means are provided for the purpose of sharp focusing that enable, on the one hand, the two eyepiece lens holders to be moved simultaneously in axial relation to the eyepiece carriers by equal amounts with the aid of a flexible member which couples together two tubular bodies each disposed to be rotatable about the corresponding eyepiece axis, and in which said means permit, on the other hand, an additional adjustment of at least one of the two eyepiece lens holders in axial direction.

In order to obtain an eyepiece suitable for binocular instruments of the foregoing kind which permits the two axial adjustments of the lens holder necessary for the purposes of sharp focusing without the two adjustments being able to affect each other, the eyepiece according to the present invention is so constructed that means are provided for producing the said two axial displacements of the eyepiece tube relative to a cylindrical box fixed to the eyepiece carrier, these means comprising a bushing axially displaceable relatively to said box and two tubular bodies rotatable about the eyepiece axis, one of said bodies being rotatably disposed on said box and being so coupled to said bushing that its rotation causes an axial displacement of the bushing, the other body being so coupled to said bushing that it participates in axial displacement of the bushing and that its rotation in relation to the bushing causes an axial displacement of the bushing, said other body being rigidly connected to the eyepiece cup and so connected to the eyepiece lens holder that it is freely rotatable in relation to the lens holder and takes along the lens holder on axial displacement.

Figure 1:
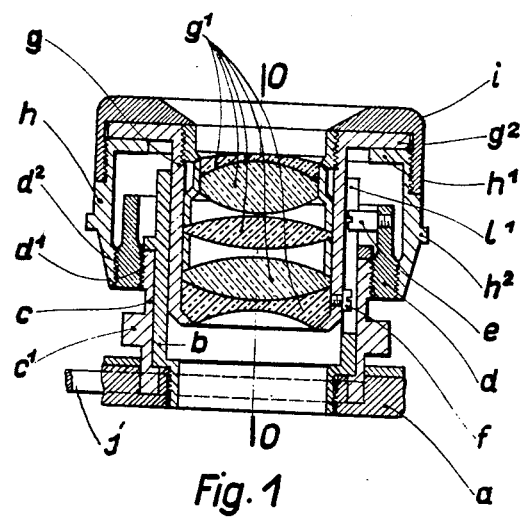
Figure 2:
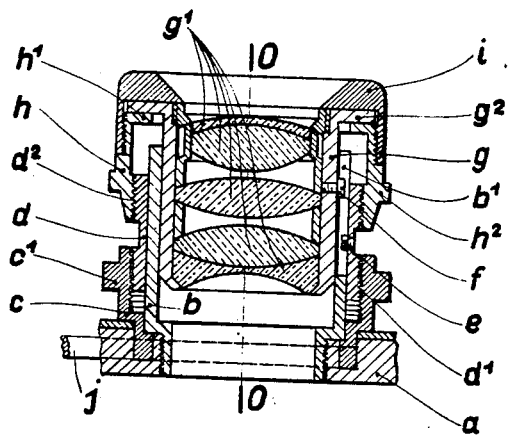

In Figures 1 and 2 of the accompanying drawing two embodiments of field glass eyepiece provided with the arrangement according to the invention are illustrated in axial section.

Referring to the drawing, both embodiments of eyepiece are so constructed that a cylindrical box $b$, the axis of which coincides with the axis of the eyepiece O—O, is screwed to an eyepiece carrier $a$. A sleeve $c$, which can be rotated by means of a milled knob $c^1$, is rotatably mounted on the box $b$. The sleeve $c$ engages, by means of a thread, in a threaded part $d^1$ of a bushing $d$, which is mounted on the box $b$. A screw having a cylindrical head $e$, which is fitted into a longitudinal groove $b^1$ in the box $b$, is fastened to the bushing $d$, so that the bushing $d$ is only able to undergo axial displacement in relation to the box $b$. The cylindrical head $f$ of a screw which is fastened to the holder $g$ of the eyepiece lenses $g^1$, mounted in the box $b$, is fitted into the same groove $b^1$. The lens holder $g$ can thus also only undergo axial displacement in relation to the box $b$.

A nut member $h$, to which is screwed an eyepiece cup $i$, engages by means of a corresponding thread in a second threaded part $d^2$ of the bushing $d$. A collar $g^2$ of the lens holder $g$ is so limited by the cup $i$ and a collar $h^1$ of the nut member $h$ that the lens holder $g$ participates in longitudinal displacements of the nut member $h$ while permitting rotation of the nut member $h$ and the cup $i$ in relation thereto. A milled knob $h^2$ serves for rotation of the nut member $h$.

For coupling an eyepiece shown in Fig. 1 or in Fig. 2 to the other eyepiece of a binocular instrument in such a manner that a rotation of the sleeve $c$ by means of the milled knob $c^1$ causes an equal rotation of the correspondent sleeve of said other eyepiece a steel band $j$ is provided which is fixed to the sleeve $c$ as well as to the said correspondent sleeve.

A rotation of the sleeve $c$ causes an axial displacement of the straight guided bushing $d$ and hence of the nut member $h$, the cup $i$ and the lens holder $g$ by equal amounts. When the nut member $h$ and the cup $i$ undergo rotation in relation to the bushing $d$—this being effected by operation of the milled head $h^2$—the nut member $h$, the cup $i$ and the lens holder $g$ of the eyepiece undergo an additional axial displacement.

The two embodiments of the invention illustrated differ from one another substantially only by different constructions of the straight guided bushing $d$. In Figure 1 the two threaded parts $d^1$ and $d^2$ have different diameters and are situated side by side in respect of the axis O—O, whereas in Figure 2 they have equal diameters and are situated one behind the other in respect of the axis O—O.

I claim:

An eyepiece for binocular instruments, particularly field glasses, comprising an eyepiece carrier, a cylindrical box fixed to said carrier, an eyepiece lens holder axially slidable in said cylindrical box, a screw fastened to said lens holder engaging with an axial slot of said cylindrical box to provide for axial displacement of said lens holder while preventing rotation, an eyepiece cup, and means for producing two axial displacements of said lens holder relative to said cylindrical box, said displacements being dependent on each other, said means comprising a bushing having two threaded portions and two tubular bodies rotatable about the eyepiece axis, one of said bodies being rotatably disposed on said box and having a thread engaging with one of said threaded portions of said bushing, a screw fastened to said bushing engaging with said axial slot of said cylindrical box so that a rotation of said first tubular body causes an axial displacement of said bushing with respect to said cylindrical box, the rotation of said body being transmitted by a flexible member to a corresponding body of the other eyepiece of said binocular instrument, said other body being rigidly connected to said eyepiece cup and having a thread engaging with said other threaded portion of said bushing so that it participates in axial displacements of said bushing and its rotation in relation to said bushing causes an axial displacement with respect to said bushing, said lens holder having an annular collar extending in a space formed by said eyepiece cup and a corresponding collar of said other body, said eyepiece cup and said other body, being freely rotatable with respect to said lens holder and taking along said lens holder on axial displacements.

References Cited in the file of this patent

UNITED STATES PATENTS

| | | |
|---|---|---|
| 838,651 | Saegmuller | Dec. 18, 1906 |
| 1,324,448 | Greiner | Dec. 9, 1919 |